United States Patent

König et al.

Patent Number: 5,556,067
Date of Patent: Sep. 17, 1996

[54] LABORATORY APPARATUS WITH RECEPTACLE FOR A STAND ROD

[75] Inventors: Hans König, Buggingen-Seefelden; Kai Koch, Ehrenstetten; Rainer Dietsche, Münstertal, all of Germany

[73] Assignee: Janke & Kunkel GmbH & Co. KG, IKA-Labortechnik, Staufen, Germany

[21] Appl. No.: 352,016

[22] Filed: Dec. 8, 1994

[30] Foreign Application Priority Data

Dec. 8, 1993 [DE] Germany ............ 43 41 774.4

[51] Int. Cl.⁶ .................................................. A47B 96/06
[52] U.S. Cl. .................. 248/220.21; 248/221.11; 248/222.13; 248/298.1; 366/273; 366/274; 403/343; 403/374
[58] Field of Search .................. 248/222.1, 223.4, 248/224.2, 225.1, 231.3, 298; 366/273, 274; 403/343, 374, 386, 387

[56] References Cited

U.S. PATENT DOCUMENTS

| D. 152,908 | 3/1949 | Rosinger | 366/274 |
|---|---|---|---|
| 2,859,710 | 11/1958 | Elsner | 248/223.4 |
| 2,935,286 | 5/1960 | Parsons | 248/227 |
| 3,061,280 | 10/1962 | Kraft et al. | 259/72 |
| 3,123,353 | 3/1964 | Schulze et al. | 269/82 |
| 3,245,665 | 4/1966 | Steel | 366/273 |
| 3,339,913 | 9/1967 | Anderson | 248/298 |
| 3,758,274 | 9/1973 | Ritchie et al. | 366/273 |
| 3,829,050 | 8/1974 | Brautaset et al. | 248/222.1 |
| 4,725,030 | 2/1988 | Miller et al. | 248/297 |
| 4,854,016 | 8/1989 | Rice | 248/231.3 |
| 5,290,521 | 3/1994 | DeStefano | 422/99 |

FOREIGN PATENT DOCUMENTS

| 1974913 | 6/1967 | Germany . |
|---|---|---|
| 1648838 | 6/1971 | Germany . |
| 7502802 | 6/1975 | Germany . |
| 3607849 | 8/1987 | Germany . |
| 3628911 | 3/1988 | Germany . |
| 9202090 | 5/1992 | Germany . |
| 4118886 | 12/1992 | Germany . |
| 4136504 | 5/1993 | Germany . |
| 9318773 | 3/1994 | Germany . |
| 9109676 | 7/1991 | WIPO . |

*Primary Examiner*—Ramon O. Ramirez
*Assistant Examiner*—Michael J. Turgeon
*Attorney, Agent, or Firm*—Panitch Schwarze Jacobs & Nadel, P.C.

[57] ABSTRACT

A laboratory apparatus, in particular a magnetic stirrer (1) or a shaker, has a receptacle (2) for a stand rod (3), the receptacle being provided in a separate stand-rod holder (4) which can be fastened to the laboratory apparatus in such a way that it is adjustable and can be fixed into position. As a result, the stand rod (3) can be fixed at various locations on the apparatus, so that each of the accessory devices connected to it, in particular sensors, dosing devices, or tubes, can be better fixed in their desired position. In addition, several stand-rod holders (4) with one stand rod each can be fastened at various locations on the laboratory apparatus at the same time, so that even in the case of complex experimental set-ups there are sufficient fastening options available for the accessory devices.

20 Claims, 3 Drawing Sheets ns in setting up sensors which, for example, should be placed at a very exact location in a container that has been set on a magnetic stirrer.

LABORATORY APPARATUS WITH RECEPTACLE FOR A STAND ROD

FIELD OF THE INVENTION

The invention pertains to a piece of laboratory equipment, in particular, a magnetic stirrer or a shaker, with a receptacle for a stand rod.

BACKGROUND OF THE INVENTION

It is already known that a receptacle, for example an opening that can accommodate a stand rod in a detachable fashion can be placed at a suitable location on laboratory equipment; that is, apparatus provided primarily for use in laboratories. Accessory devices can then be fastened to this rod and fixed in a specifically desired position. In this way, a thermometer or a dosing device, for example, can be placed from above into a container that is sitting on a magnetic stirrer, and fixed into a desired position. When doing this, however, it is difficult to arrange a number of such accessory devices around a piece of laboratory equipment at the same time and to fasten all of these to one and the same stand rod, since the means for fastening these accessory devices, which can, for example, consist of sensors, dosing devices, charging tubes or the like, may mutually interfere with one another.

Depending on the location of the apparatus and on the local conditions, it can be disadvantageous to fasten the stand rod to the existing receptacle in the laboratory apparatus if, for example, this apparatus were to foul other adjacent pieces of equipment, or if charging tubes had to be run from one very specific direction.

SUMMARY OF THE INVENTION

The object therefore exists of creating a piece of laboratory equipment of the type mentioned at the beginning, in which the fitting of sensors or accessory devices can, to a large extent, be freely chosen and adapted to the local conditions at hand.

The solution to this object resides in the fact that the receptacle is provided on a separate stand-rod holder, and that the stand-rod holder is fastened to the laboratory apparatus in an adjustable manner and can be fixed in position. As a result, the receptacle for the stand rod is no longer fixed in a predetermined manner at a specific location on the laboratory apparatus, but can instead be arranged at various locations on the laboratory apparatus by means of the separate, positionable stand-rod holder, so that the stand rod may be brought into a favorable position each time.

It is especially beneficial if the stand-rod holder is continuously adjustable, particularly if it can slide and be fixed into position. The stand rod can then be positioned even more exactly, which is particularly advantageous in setting up sensors which, for example, should be placed at a very exact location in a container that has been set on a magnetic stirrer.

One embodiment of the invention provides for the stand-rod holder having at least one projection that engages in a form-fitting (i.e., positive fitting or interlocking) fashion with a guide, in particular, a guide rail on the laboratory apparatus. As a result of the form-fitting connection, the stand-rod holder is guided in the guide rail during adjustments, so that the holder cannot slip laterally out of the guide rail or tip with respect to this rail. The adjusting of the stand rod is made easier as a result of this.

It is helpful if the stand-rod holder is separably fastened to the laboratory apparatus and/or the guide. Different stand-rod holders with varying receptacles can then be fastened to the laboratory apparatus, so that even stand rods with differing cross-sections and/or with different diameters can be secured.

In addition, a number of stand-rod holder holders can be fastened to the laboratory apparatus at the same time. In the case of complex experimental set-ups, in which several dosing devices, charging tubes, sensors or the like are to be associated with the laboratory apparatus, sufficient fastening options are thereby available by means of which each of the individual accessory devices can be set up and fixed in position in an optimal fashion.

It is advantageous if the guide for the insertion of the stand rod is open on at least one end. The form-fitting connection can then be produced in a simple way by inserting the stand-rod holder at the front of the open end of the guide.

It is especially beneficial if the laboratory apparatus has guides on at least two opposite sides, in particular on the longitudinal sides. Stand-rod holders can then be secured to both sides of the laboratory apparatus. As a result of this lateral arrangement of the guide(s), no space need be reserved for the stand rod, or more specifically for the stand-rod holder, on the top side of the apparatus, so that this top side remains completely available, for example in the case of magnetic stirrers, for placing operating controls, a hot plate, or for setting up a container.

A guide that is especially economical and simple to produce results if the guide rail has a guide slot into which the stand-rod holder engages. The guide rail can then be produced cost-effectively and in large quantities as a stamped part.

In this regard, it is advantageous if the stand-rod holder has a hook-like projection that engages in the guide slot and grips behind the guide rail on at least one edge, in particular the upper edge. A clearance space is then provided behind the guide rail for the engagement of the hook-like projection. The stand-rod holder is thus joined with the guide rail in a form-fitting fashion, and as a result, cannot slide out of the guide rail or tip when being relocated.

An especially favorable embodiment of the invention provides for the housing of the laboratory apparatus having a housing upper part and a housing lower part, the guide rail having two guide rail parts which are spaced from one another and between which the guide slot is located, and one of the guide rail parts being joined with the housing upper part and the other with the housing lower part, and in particular joined as one piece. As a result, the housing of the laboratory apparatus can be manufactured, in an especially economical and practical fashion, of just two pieces in which the guide rail has been integrated.

It is advantageous if, for holding and/or fixing the stand-rod holder into position, a clamp is provided, in particular on the stand-rod holder. The stand-rod holder can be fixed thereby to the guide rail in any desired position.

One embodiment of the invention provides that the clamp be configured as an eccentric or can be operated by means of an eccentric. In this manner, the eccentric brings about a transfer of force that makes the secure clamping of the stand-rod holder easier. An especially simply designed clamping device results if the eccentric and, possibly, a clamping piece joined with it, is provided on the stand-rod holder to securely clamp it to the guide rail.

For adjusting the eccentric, a hand wheel, a lever, or a similar kind of actuating element can be provided on the stand-rod holder. The stand-rod holder can then be secured to the laboratory apparatus in a simple way without using a tool.

An especially beneficial embodiment provides that the axis of the eccentric be arranged approximately at a right angle to the longitudinal axis of the stand rod. The hand wheel or the actuating element for adjusting the eccentric can then be placed on the stand-rod holder so that it protrudes laterally in order to make it especially easy to grip. In conjunction with that, the actuating element and the eccentric can be made as one piece.

In order that the stand-rod holder can be more easily assembled during manufacture, it is advantageous if the eccentric is inserted into a receiver hole in the housing of the stand-rod holder and/or in the clamping piece, and if on the outer circumference of the eccentric at least one flexible latching projection that springs in the direction of the eccentric axis is provided, which in its inserted position enlarges the cross-section of the eccentric and secures it against being pulled out of the receiver hole(s) in the direction opposite the insertion direction. The eccentric then needs only to be inserted into the receiver hole of the clamping piece during assembly, whereby the latching projections yield or give way in a spring-like fashion and, when the inserted position has been attained, return to their non-deviated position in which they enlarge the cross-section, and then secure the eccentric against being pulled out of the receiver hole.

It is useful if the receptacle for the stand-rod holder is configured as a threaded bore or as a threaded rod in or on which the stand rod is screwed. The stand rod can thus be fastened to the stand-rod holder in an especially simple and secure way.

BRIEF DESCRIPTION OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings in different scales.

DETAILED DESCRIPTION OF PREFERRED EMBODIMENTS

Figure 1:
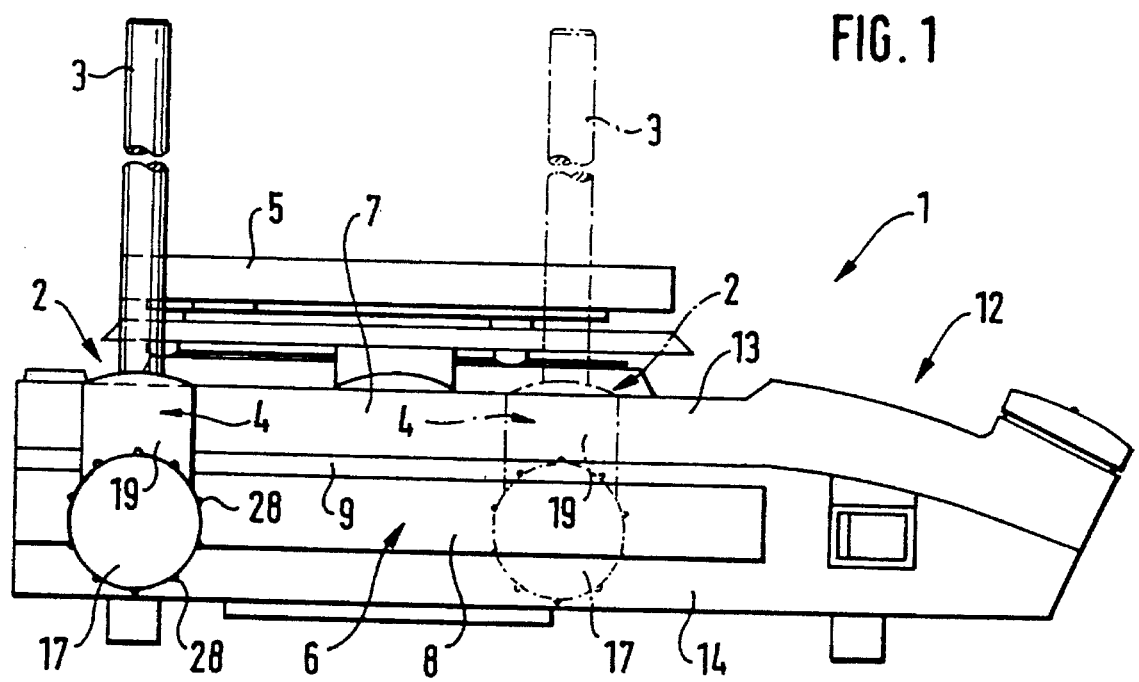
FIG. 1 shows a side view of a magnetic stirrer with a stand-rod holder according to the invention which is carrying a stand rod, and which is slidable and fixable into position on a guide rail provided on a longitudinal side of the magnetic stirrer housing, and in which an additional stand-rod holder with stand rod is indicated by means of dashed lines.

A magnetic stirrer 1 (FIG. 1) has a receptacle 2 for a stand rod 3, which receptacle is arranged in a separate stand-rod holder 4 secured to the magnetic stirrer 1 in such a way that it is adjustable and can be fixed into position. As a result, the stand rod 3 can be fixed at various locations on the magnetic stirrer 1 so that it is possible for each of the accessory devices connected to it, for example, a thermometer for measuring the temperature of a medium to be stirred, charging or discharge tubes for a container located on the hot plate 5, or an optical sensor for checking the container, to be positioned in the desired location and fixed into position.

The magnetic stirrer 1 has on its two longitudinal sides a guide 6 in which the stand-rod holder 4 is continuously adjustable and can be fixed into position. The stand-rod holder 4 is separably fastened to the guide 6 of the magnetic stirrer 1. As a result, several stand-rod holders 4 can be inserted into the guide 6, so that, if necessary, several stand rods 3 can be fastened to the magnetic stirrer 1 at the same time. In the case of complex experimental set-ups, in which several sensors, dosing devices, tubes, or similar kinds of accessory devices are needed at the magnetic stirrer 1, sufficient fastening options are thereby available. In addition, stand-rod holders 4 with differing receptacles 2 can be fastened into the guide 6, so that stand rods 3 with differing cross-sections or with differing diameters can be secured to the magnetic stirrer 1 as well.

Since guides 6 are provided on both sides of the magnetic stirrer 1, this results in additional fastening options for stand rods 3, which is particularly advantageous when tubes or measuring cables have to be run from various directions to a container that is located on the hot plate 5.

Figure 3:
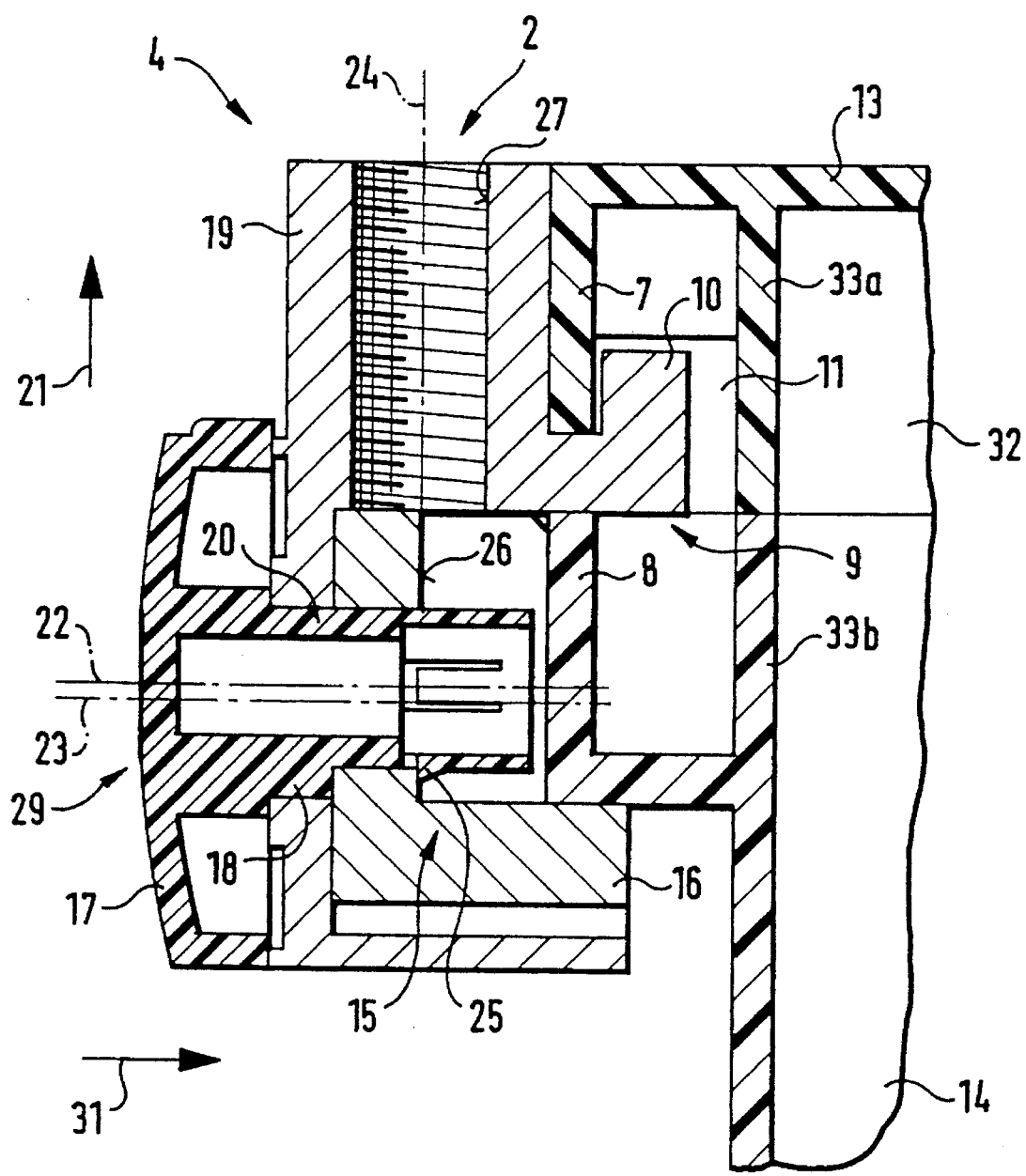
FIG. 3 is a further enlarged longitudinal section through the center plane of the stand-rod holder shown in FIG. 1, which has been placed into the guide in the magnetic stirrer housing and securely clamped to it.
Figure 4:
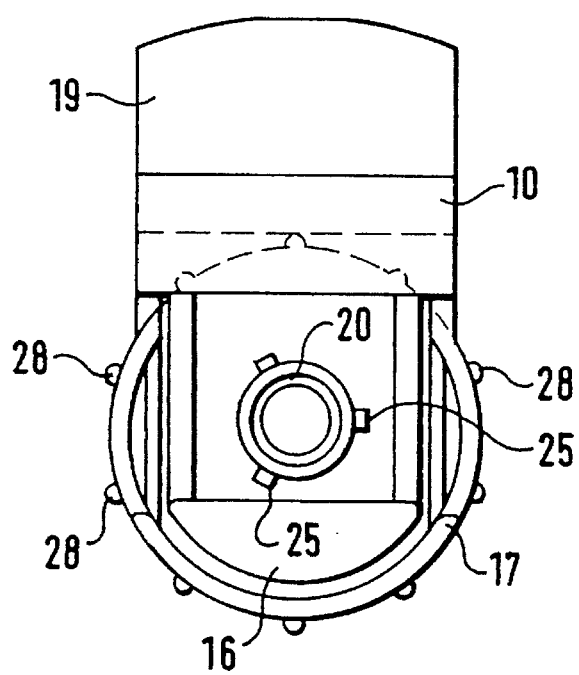
FIG. 4 is a rear view of the stand-rod holder shown in FIG. 2.

The guide 6 is configured as guide rails with an upper guide rail part 7 and lower guide rail part 8 and a guide slot 9 lying between them. The stand-rod holder 4 has a hook-like projection 10 (FIG. 3) that engages in the guide slot 9 and grips behind the upper guide rail part 7. For the engagement of the hook-like projection 10, clearance space 11 is provided behind the upper guide rail part 7, and more specifically, along the entire length of the guide 6. The hook-like projection 10 extends somewhat beyond the full width of the stand-rod holder 4 (FIG. 4). As a result, the stand-rod holder 4 is joined with the guide 6 in a form fitting fashion, so that the stand rod 3 and the accessory devices fastened to it cannot tip during sliding of the stand-rod holder 4. In addition, the hook-like projection 10 prevents the stand-rod holder 4 from being unintentionally pulled out of the guide 6 during adjustments. Between the housing interior 32 of the magnetic stirrer housing 12 and the clearance space 11 there is provided a dividing wall 33a, 33b that prevents dirt from making its way into the housing interior 32, and, in addition, improves the mechanical stability of the magnetic stirrer housing 12.

The guide 6 and guide slot 9 are open at their front ends so that the stand-rod holder 4 can more easily be inserted into the guide 6.

The magnetic stirrer housing 12 of the magnetic stirrer 1 has a housing upper part 13 that is configured roughly in a dish shape and a housing lower part 14 that is likewise configured roughly in a dish shape, wherein the upper guide rail part 7 is formed in one piece with the housing upper part 13, and the lower guide rail part 8 is formed in one piece with the housing lower part 14. As a result of this, the complete magnetic stirrer housing 12, including the guide 6, can be manufactured in an especially cost-effective way from only two injection-molded parts.

In order to fix the stand-rod holder 4 securely in the desired position, a clamp 15 is provided on the stand-rod holder 4 by means of which the lower guide rail part 8 can be clamped between a clamping piece 16 and the hook-like projection 10. Attached to the stand-rod holder 4 on the outside is an actuating element 29 in the form of a hand wheel 17 joined as a single piece with a shaft 18 that is inserted into a hole in the housing 19 of the stand-rod holder 4 and carrying on its interior an eccentric 20 that passes through a receiver hole in the clamping piece 16. By means of an appropriate turning of the hand wheel 17, the clamping piece 16 can be moved in the clamping direction 21, whereby the lower guide rail part 8 is clamped between the clamping piece 16 and the hook-like projection 10, and as a result, the stand-rod holder 4 is fixed in position on the guide 6. In conjunction with this, the eccentric positioning of the clamping piece 16 produces a force multiplication, so that a large clamping force can be applied with comparatively little hand effort.

The eccentric 20 and the shaft 18 are configured in one piece with the hand wheel 17, and the eccentric axis 22 and hand wheel axis 23 are oriented in a direction that is approximately perpendicular to the longitudinal axis 24 of the stand rod 3. The hand wheel 17 can thus be mounted laterally of the stand-rod holder 4 so that it is especially easy to grip. The eccentric 20 has three latching projections 25 that are distributed evenly around its circumference and that lie against the inner wall 26 of the clamping piece 16 when in the inserted position and thus fix the hand wheel 17 plus the clamping piece 16 in the axial direction in the housing 19 of the stand-rod holder 4.

In order to make possible an especially simple assembly of the stand-rod holder 4, the latching projections 25 can swing out in a spring-like fashion in the direction of the eccentric axis 22. During assembly, the eccentric 20 then needs only to be inserted into the receiver hole in the clamping piece 16, whereby the latching projections 25 give in a spring-like fashion in the direction of the eccentric axis 22, and when the inserted position has been reached, they return to their original position and then lie against the inner wall 26 of the clamping piece 16. As a result, the hand wheel 17, the shaft 18, and the eccentric 20 are secured against being pulled out axially from the receiver hole in the direction opposite to the direction of insertion 31.

Figure 2:
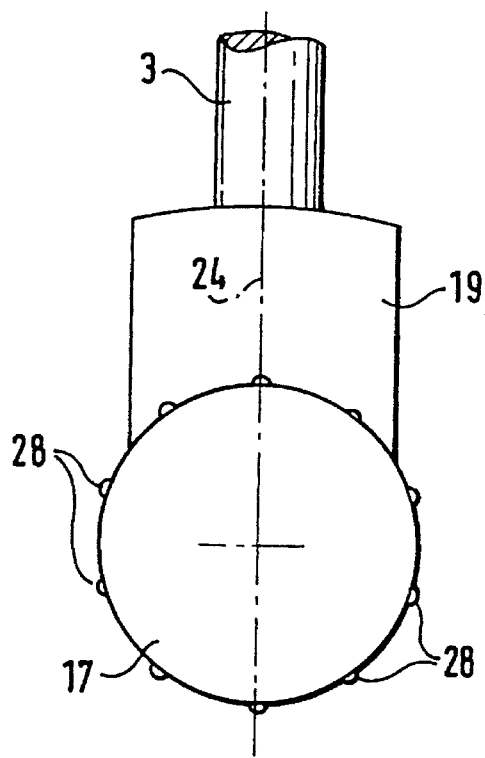
FIG. 2 is an enlarged front view of the stand-rod holder shown in FIG. 1 with inserted stand rod.
Figure 5:
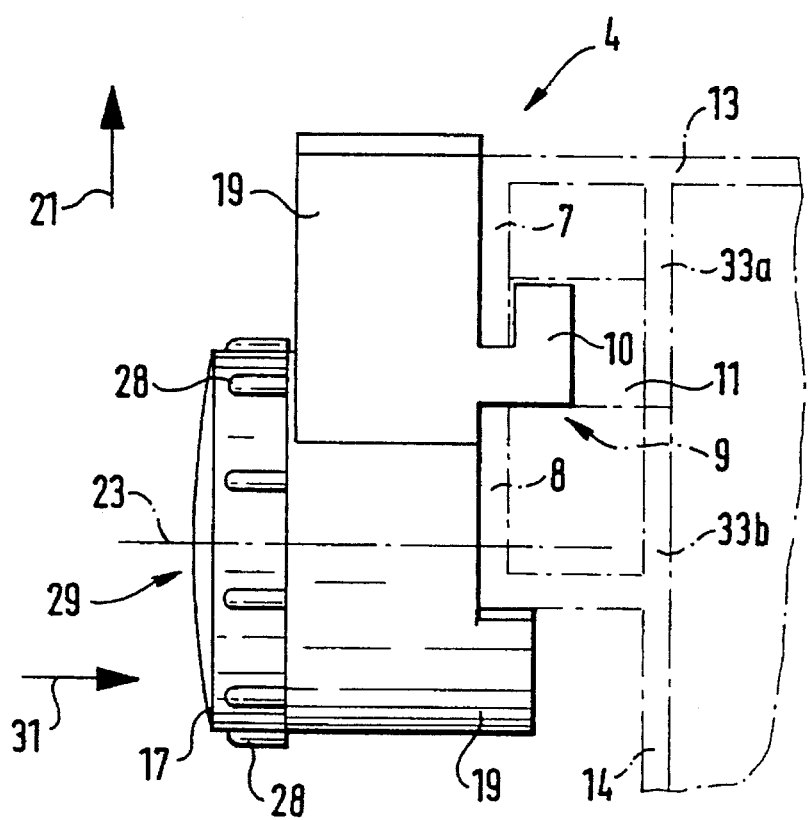
FIG. 5 shows a side view of a stand-rod holder shown in FIG. 1, wherein the guide in the magnetic stirrer housing that engages with the stand-rod holder is represented with dashed lines.

Visible in FIGS. 2, 4 and 5 are the ribs 28 that are distributed evenly over the outer circumference of the hand wheel 17 and run in the axial direction, and that are intended to improve the grip on the hand wheel 17.

The receptacle 2 in the stand-rod holder 4 is configured as a threaded bore 27 into which the stand rod 3, which has a matching opposite thread, can be screwed. As a result, the stand rod 3 can be fastened to the stand-rod holder 4 in a simple way.

It will be appreciated by those skilled in the art that changes could be made to the embodiment described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A laboratory apparatus comprising a housing (12) having a housing upper part (13) and a housing lower part (14), a guide rail having two guide rail parts (7, 8) spaced from one another and forming between them a guide slot, one of the guide rail parts being joined with the housing upper part (13) and the other guide rail part being joined with the housing lower part (14), a receptacle for a stand rod for affixing accessories to the apparatus, said receptacle (2) being provided on a separate stand-rod holder (4), and means for fastening said stand-rod holder (4) to the laboratory apparatus in adjustable and position-fixable manners.

2. Apparatus according to claim 1 comprising a magnetic stirrer.

3. Apparatus according to claim 1, wherein the stand-rod holder (4) is continuously adjustable.

4. Apparatus according to claim 1, wherein the stand-rod holder (4) is slidably fastened to the apparatus.

5. Apparatus according to claim 1, wherein the stand-rod holder (4) has at least one projection that engages in a form-fitting fashion with the guide rail.

6. Apparatus according to claim 5, wherein the means for fastening stand-rod holder (4) comprises a separable fastener to the apparatus.

7. Apparatus according to claim 5, wherein the guide rail is open on at least one end.

8. Apparatus according to claim 5, comprising a guide rail on each of at least two opposite sides.

9. Apparatus according to claim 5, wherein the stand-rod holder (4) engages the guide slot (9).

10. Apparatus according to claim 9, wherein the stand-rod holder (4) has a hook-like projection (10) that engages in the guide slot (9) and grips behind the guide rail against at least one edge.

11. Apparatus according to claim 10, wherein the projection (10) grips behind an upper edge of the guide rail (7).

12. Apparatus according to claim 1, wherein a plurality of stand-rod holders (4) can be separably fastened to the apparatus.

13. Apparatus according to claim 1, comprising a clamp (15) for fixing the stand-rod holder (4) into position.

14. Apparatus according to claim 13, wherein the clamp (15) is located in the stand-rod holder.

15. Apparatus according to claim 13, wherein the clamp (15) includes an eccentric (20).

16. Apparatus according to claim 15, comprising a hand wheel (17) for adjusting the eccentric (20) on the stand-rod holder (4).

17. Apparatus according to claim 15, wherein an axis (22) of the eccentric is arranged approximately at a right angle to a longitudinal axis (24) of the stand rod (3).

18. Apparatus according to claim 15, wherein the eccentric (20) is placed into a receiver hole in the stand-rod holder (4), and an outer circumference of the eccentric (20) has at least one flexible latching projection (25) that springs radially to an eccentric axis (22), said projection in its inserted position serving to enlarge a cross-section of the eccentric (20) and secure it against being withdrawn from the receiver hole(s) in a direction opposite an insertion direction (31).

19. Apparatus according to claim 1, wherein the receptacle (2) for the stand-rod holder (4) is configured as a threaded bore (27) or a threaded rod to which the stand rod (3) can be screwed.

20. A laboratory apparatus comprising a separate stand-rod holder (4) having a receptacle for a stand rod for affixing accessories to the apparatus, and means for fastening said stand-rod holder (4) to the laboratory apparatus in adjustable and position-fixable manners, the fastening means including a clamp (15) for fixing the stand-rod holder (4) into position, the clamp (15) includes an eccentric (20) which is placed into a receiver hole in the stand-rod holder (4), and an outer circumference of the eccentric (20) has at least one flexible latching projection (25) that springs radially to an eccentric axis (22), said projection in its inserted position serving to enlarge a cross-section of the eccentric (20) and secure it against being withdrawn from the receiver hole in a direction opposite an insertion direction (31).

* * * * *